April 12, 1966    L. E. HERR    3,245,492
SWING AXLE SUSPENSION
Filed March 31, 1964
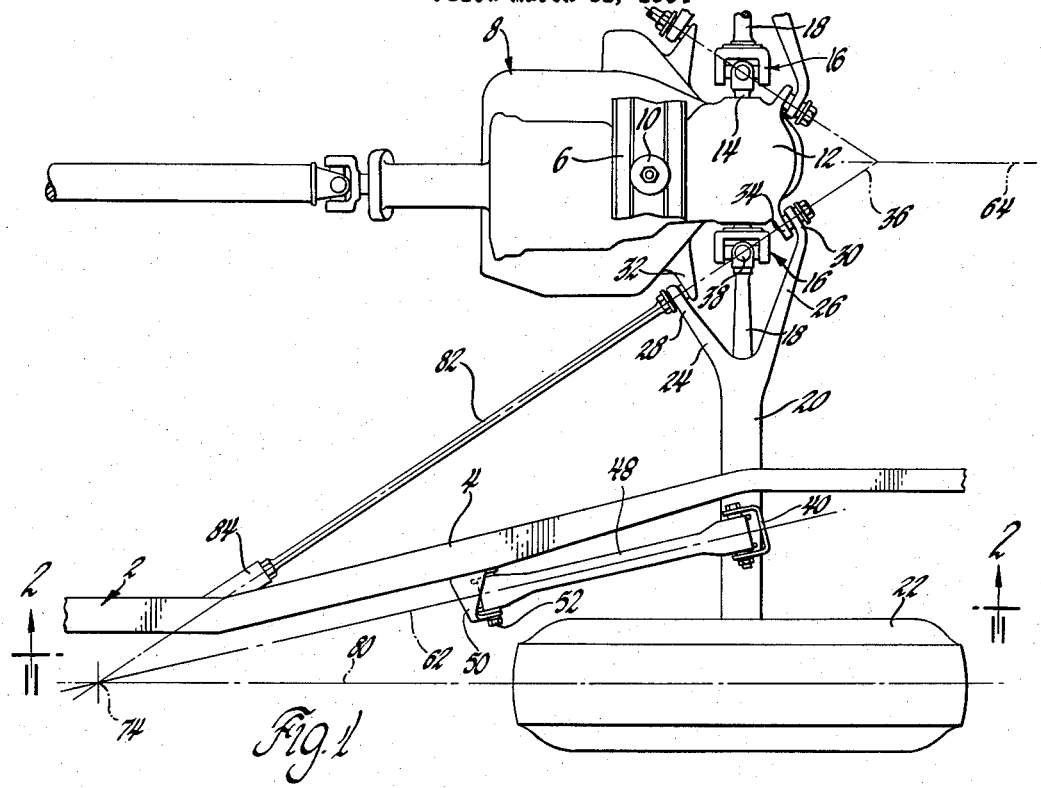
Fig. 1
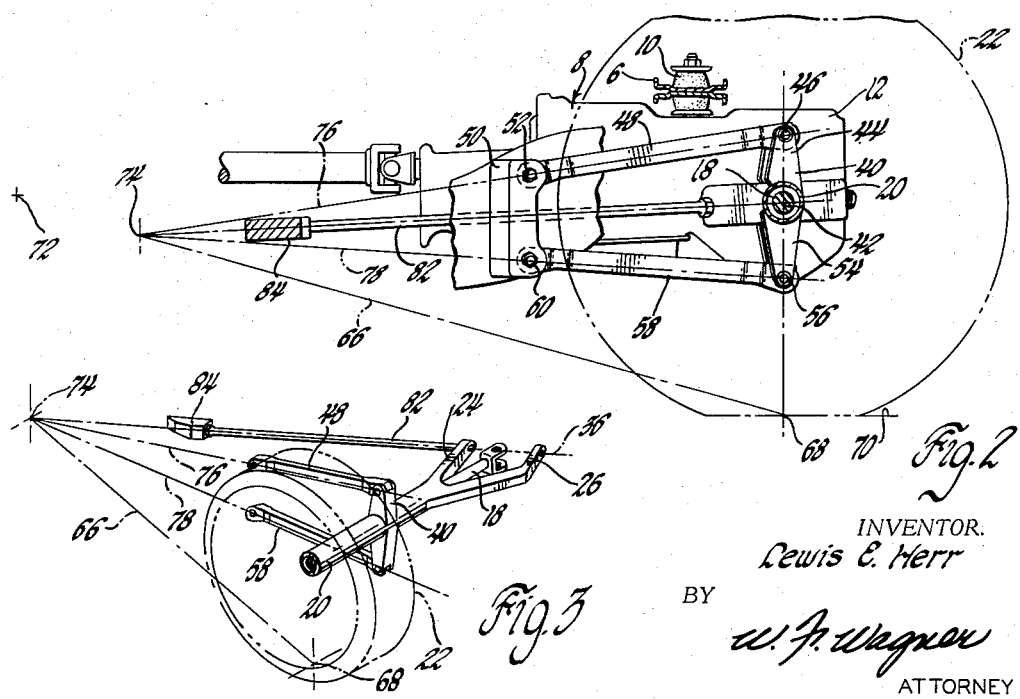
Fig. 2
Fig. 3
INVENTOR.
Lewis E. Herr
BY
W. F. Wagner
ATTORNEY United States Patent Office 3,245,492
Patented Apr. 12, 1966

3,245,492
SWING AXLE SUSPENSION
Lewis E. Herr, Pontiac, Mich., assignor to General Motors Corporation, Detroit, Mich., a corporation of Delaware
Filed Mar. 31, 1964, Ser. No. 356,166
1 Claim. (Cl. 180—73)

This invention relates to vehicle suspension and more particularly to independent rear wheel suspension.

An object of the invention is to provide an improved vehicle suspension.

Another object is to provide an improved swing axle type independent rear wheel suspension.

A further object is to provide a swing axle rear suspension which is constructed and arranged so as to resist the tendency of the rear portion of the vehicle to "squat" during acceleration.

A still further object is to provide a suspension of the stated character which is geometrically arranged to induce rear wheel understeer under conditions in which the vehicle is negotiating a turn.

These and other objects, advantages and features of the invention will become more readily apparent as reference is had to the accompanying specification and drawing wherein:

FIGURE 1 is a partial plan view of the rear portion of a vehicle chassis incorporating swing axle construction in accordance with the invention;

FIGURE 2 is a view looking in the direction of arrows 2—2 of FIGURE 1; and

FIGURE 3 is a schematic perspective view of the construction shown in FIGURES 1 and 2.

In the classic form of swing axle rear wheel suspension, each driving wheel is operatively connected to a frame mounted differential drive mechanism by a laterally extending vertically swingable live half axle which in turn is surrounded by a tubular wheel control arm structure having longitudinally spaced inboard pivotal connections with the differential structure that establish an axis of swing for the wheel which is collinear with the geometric center of a universal joint operatively connecting the half axle to the differential output. While this type of swing axle construction is highly desirable from the standpoint of simplicity and relatively low cost, two behavioral characteristics are exhibited which adversely affect vehicle operation and handling. First, owing to the fact that differential torque is absorbed by the vehicle sprung mass through the differential mounts, in the absence of modifying structure, acceleration torque induces a condition known as "squat" wherein the rear portion of the vehicle sprung mass descends significantly below the normal standing height. While it is known that the condition may be corrected by inclining the reaction line upwardly toward the front of the vehicle, this solution causes introduction of rear wheel oversteer geometry which produces undesirable handling characteristics in turns. The present invention is directed to a construction which simultaneously achieves elimination of squat and introduction of rear wheel understeer geometry.

Referring now to the drawing and particularly FIGURES 1 and 2, there is shown a portion of a vehicle chassis incorporating the invention. Inasmuch as the suspension construction is identical for the left and right sides of the vehicle, both the drawings and the following description are made with reference to the left hand side only, it being understood that the description applies equally to the right hand side, not shown. The reference numeral 2 generally designates the vehicle superstructure or sprung mass which includes longitudinally extending side rails 4. Extending transversely between side rails 4 is a cross member 6 from the center of which is suspended a transmission differential assembly 8 by means of a single opposed grommet type elastic mount 10. The differential portion 12 of assembly 8 is provided with laterally oppositely extending output shafts 14, the outer ends of which form one half of univeral joints 16. The other half of joints 16 are formed integrally on the inboard ends of live axles 18. Live axle 18 extends transversely outwardly through a tubular control arm 20 for connection with a traction wheel 22 which is rotatably mounted on the outer end of control arm 20. The inner end of arm 20 is formed with spaced apart inboard branches 24 and 26 having bearing portions 28 and 30 which are pivotally mounted on brackets 32 and 34 of assembly 8 for movement about a horizontal axis 36 which is collinear with the geometric center 38 of joint 16.

In accordance with one feature of the invention, control arm 20 is formed intermediate of its length with a bracket 40 which extends vertically oppositely from the axis of rotation 42 of wheel 22. At its upper end 44, bracket 40 is pivotally connected by a pin joint 46 to the rearward end of an upper torque arm 48, the forward end of which is pivotally connected to a frame mounted bracket 50 by a pin joint 52. The lower end 54 of bracket 40 in turn is pivotally connected by a pin joint 56 to lower torque arm 58, the forward end of which is pivotally connected to bracket 50 by a pin joint 60. Torque arms 48 and 58 are arranged in a common vertical plane 62 which diverges forwardly relative to the vehicle centerline 64 while the individual arms converge forwardly as viewed in side elevation. According to the invention, as seen best in FIGURE 2, the degree of convergence mentioned is determined by projecting a line 66 between the point of contact 68 of the wheel 22 with the ground 70 and the point 72 which is located in a vertical transverse plane containing the axis of rotation of the vehicle front wheels (not shown) and at a height above ground 70 equal to the height of the vehicle center of gravity above ground 70 and selecting an effective torque arm axis 74 therealong. The positions of pivots 52 and 60 are then plotted so as to lie along lines 76 and 78 extending between the axis 74 and pivots 46, 56. Convergence of both torque arms relative to the vehicle centerline 64 is determined by projecting lines 76 and 78 in plan view so as to intersect axis 74 in the plane 80 of wheel 22.

In order to accommodate the geometry induced by the indicated intersection in the plane 80, as seen in FIGURE 1, the axis 36 for the pivotal connections of bearing portions 28 and 30 of control arm 20 is arranged in forward diverging relationship which also intersects axis 74 in the plane 80 of wheel 22. Therefore, according to another feature of the invention, the elastic medium in the form of a torsion bar 82 is disposed along axis 36 and connected at its rearward end to the inboard end 24 of control arm 20, while the forward end is received in an anchor socket 84 mounted on frame side rail 4.

When constructed and arranged in the manner described, differential torque generated during vehicle acceleration passes to control arm 20 through the bearing portions 28 and 30 and is restrained by the torque arms 48 and 58. Since the differential torque is absorbed by the torque arms, if the instant center of axis 74 of the torque arms lies on the line 66 in the plane 80 of wheel 22, the vehicle will exhibit no squat tendency. In respect to understeer, any desired amount is obtainable concurrently with the anti-squat function merely by selecting the height at which axis 74 intersects line 66 relative to the height of the axis of rotation 42 of the wheel. Thus, if axis 74 is placed along line 66 at a level lower than that shown in the illustrated embodiment, the degree of understeer will be increased, and conversely, if selected to occupy a higher level along line 66, the understeer effect will be reduced. In all cases, however, the common intersection of lines 76 and 78 and axis 36 preferably lies in the plane 80 of the wheel in order to prevent any reaction at the pivoted inboard ends 24 and 26 of control arm 20 due to acceleration or braking.

While but one embodiment of the invention has been shown and described, it will be apprent that other changes and modifications may be made therein. It is, therefore, to be understood that it is not intended to limit the invention to the embodiment shown, but only by the scope of the claim which follows.

I claim:

In a vehicle, a drive wheel, a half axle rigidly connected at its outer end to said wheel, a differential assembly resiliently supported on said vehicle, a universal joint operatively connecting the inner end of said axle to said differential, a suspension control arm having an outer end rotatably supporting said wheel, said arm having spaced apart inner ends pivotally connected to said differential for swinging movement about an oblique axis collinear with the geometric center of said universal joint, means forming vertically oppositely extending projections on said arm intermediate the length thereof, a pair of vertically spaced torque arms pivotally connected at their opposite ends to said vehicle and said oppositely extending projections respectively, the pivotal connections being located so that the projected major axes of said torque arms intersect in the plane of said wheel along a line extending from a point on the vertical transverse plane containing the axis of rotation of the vehicle front wheel at the level of the vehicle center of gravity and the point of wheel contact with the ground, and vehicle supporting torsion spring means interposed between said control arm and said vehicle along an axis intersecting the intersection of the projected major axes of said torque arms.

References Cited by the Examiner

UNITED STATES PATENTS

| 2,968,358 | 1/1961 | De Lorean | 180—73 |
| 2,981,353 | 4/1961 | Rosenkrands | 180—73 |
| 3,149,690 | 9/1964 | Rosenkrands et al. | |

FOREIGN PATENTS 493,316  4/1954  Italy.

BENJAMIN HERSH, *Primary Examiner.*